(12) United States Patent
Strecker

(10) Patent No.: US 6,373,299 B1
(45) Date of Patent: Apr. 16, 2002

(54) ELECTRIC DRIVER CIRCUIT AND METHOD

(75) Inventor: Markus Strecker, Munich (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/729,467

(22) Filed: Dec. 4, 2000

(51) Int. Cl.[7] .................................................. H03K 3/06
(52) U.S. Cl. ........................ 327/112; 327/108; 318/563
(58) Field of Search ................................. 327/108, 327, 327/112, 328, 333, 331, 391, 374; 318/563, 254, 364, 560

(56) References Cited

U.S. PATENT DOCUMENTS 5,455,496 A  *  10/1995  Williams et al. ............. 318/563
5,859,510 A  *   1/1999  Dolan et al. ................. 318/254
6,157,153 A  *  12/2000  Uegami et al. .............. 318/364

* cited by examiner

*Primary Examiner*—Tuan T. Lam
*Assistant Examiner*—Hiep Nguyen

(57) ABSTRACT

The invention regards an electric circuit (200; 300; 400; 500) comprising a first electronic control circuit (201; 301) controlling the operation of a first electric load (102) to operate alternatively in a push mode or in a pull mode. To reduce the costs an electric circuit is proposed wherein said first electronic control circuit (201; 301) controls the driving of a second electric load (203) in cooperation with a second electronic control circuit (202; 302).

20 Claims, 2 Drawing Sheets

-PRIOR ART-

ELECTRIC DRIVER CIRCUIT AND METHOD

FIELD OF THE INVENTION

The present invention generally relates to electric and electronic circuits, and, more particularly, relates to a driver circuit, and to a method and therefore.

BACKGROUND OF THE INVENTION

Electric and electronic circuits and combinations thereof are essential in modern cars. Automotive electronics can be found, for example, in motor management systems, ignition and/or injection systems, anti-lock braking systems, in gear shifting, and elsewhere. The combination of mechanical and electronic components, known under the term "mechatronics", plays an ever-increasing role.

To give an example, for purposes of explanation only, and not intended to be limiting, the driver's seat and further seats can be adjusted by pushing keys located inside the car. Such seat has electric loads or actuators, commonly electric motors, to change the position of various parts of the seat (e.g. in X-direction and Y-direction). Commonly, each electric actuator or motor is driven by a dedicated electronic control unit or electronic control circuit to operate alternatively in a push mode or a pull mode enabling movement in opposite directions.

The present invention seeks to provide an electric circuit comprising electronic control circuits and a method for driving electric loads which mitigate or avoid this and other disadvantages and limitations of the prior art.

DETAILED DESCRIPTION OF A PREFERRED EMBODIMENT

Figure 1:
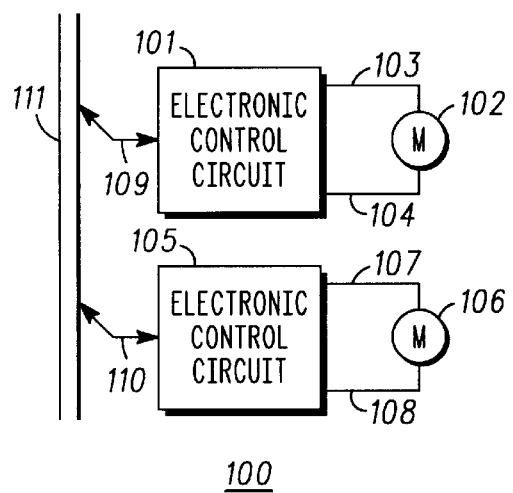
FIG. 1 illustrates a known electric circuit for driving two electric motors.

A known electric circuit 100, shown in FIG. 1, comprises an electronic control circuit (ECC) 101, an electronic control circuit 105, an electric motor 102, an electric motor 106 and a bus 111. The bus 111 provides data and control signals to the electronic control circuit 101 via an interface 109 and to the electronic control circuit 105 via an interface 110 for independently driving the electric motor 102 and the electric motor 106 alternatively in a pull mode or in a push mode. For example, in the pull mode, a part of a seat in a car is moved forward or up, while the part of the seat is moved backward or down in the push mode. A terminal 103 and a terminal 104 of the motor 102 are electrically connected with corresponding outputs of the electronic control circuit 101 as well as a terminal 107 and a terminal 108 of the motor 106 are electrically connected with corresponding outputs of the electronic control circuit 105. Each of the electronic control circuits 101 and 105 represents a selectively addressable, different node of a control and data network (not shown), i.e. a data network for operating various actuators, motors or solenoids in a car, in this example.

In a first step, a network controller (not shown) of the control and data network provides first data and control signals to the electronic control circuit 101 via the interface 109, e.g. when a key (not shown) inside the car is manually actuated or when a switch (not shown) is automatically actuated by a control logic (not shown). The electronic control circuit 101 applies a first electric voltage to the terminal 103 and a second electric voltage to the terminal 104 so-that the drive shaft of the motor 102 performs a rotation in a direction and/or for a period of time, which is determined by the characteristics of the first data and control signals.

In a second step, the network controller provides second data and control signals to the electronic control circuit 105 via the interface 110 and the electronic control circuit 105 applies a third electric voltage to the terminal 107 and a fourth electric voltage to the terminal 108 so that the drive shaft of the motor 106 performs a rotation in a direction and/or for a period of time, which is determined by the characteristics of the second data and control signals. How to assemble and operate such a network is known by those skilled in the art and thus shall not be described in detail.

Figure 2:
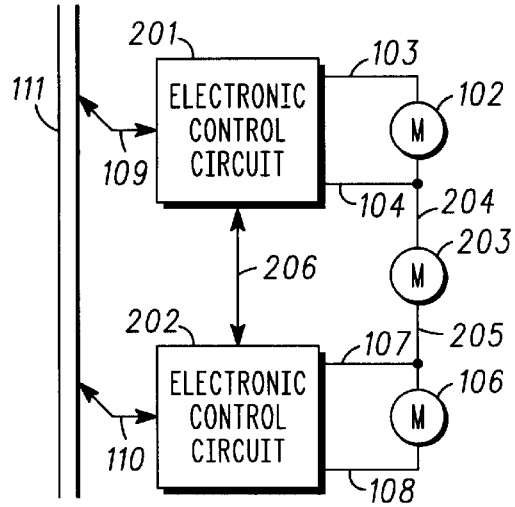
FIG. 2 illustrates a first embodiment of the invention of an electric circuit for driving the two electric motors and a further electric motor.

The electric circuit 200 according to a first embodiment of the invention for driving the two motors 102 and 106, shown in FIG. 2, is distinguished from the known electric circuit 100 of FIG. 1, in that the electronic control circuit 101 is substituted by an electronic control circuit 201, the electronic control circuit 105, is substituted by an electronic control circuit 202 and in that a terminal 204 of a motor 203 is connected with the terminal 104 and a terminal 205 of the motor 203 is connected with the terminal 107. The electronic control circuits 201 and 202 communicate with each other via an interface 206.

In a first step, the network controller (not shown) provides data and control signals to the electronic control circuit 201 via the interface 109, initiating the functions, which have been explained in connection with FIG. 1 and electronic control circuit 101. Accordingly, the electronic control circuit 201 applies a first electric voltage to the terminal 103 and a second electric voltage to the terminal 104 so that the drive shaft of the motor 102 performs a rotation in a direction and/or for a period of time, which is determined by the characteristics of the first data and control signals.

In a second step, the network controller provides data and control signals to the electronic control circuit 202 via the interface 110, initiating the functions, which have been explained in connection with FIG. 1 and electronic control circuits 105. The electronic control circuit 202 applies a third electric voltage to the terminal 107 and a fourth electric voltage to the terminal 108 so that the drive shaft of motor 106 performs a rotation in a direction and/or for a period of time, which is determined by the characteristics of the data and control signals.

In a third step, the network controller provides data and control signals to the electronic control circuit 201 via the interface 109 and data and control signals to the electronic control circuit 202 via the interface 110 instructing the electronic control circuits 201 and 202 to co-operate and to jointly drive motor 203 in a pull mode or in a push mode, depending on the specific data and control signals.

Preferably, in the third or a following step, the electronic control circuit 201 disconnects the power flow through the terminal 103 and applies an electric voltage to the terminal 104, which is determined by the characteristics of the data and control signals. Preferably, in similar manner, the electronic control circuit 202 disconnects the power flow through the terminal 108 and applies an electric voltage to the terminal 107, which is determined by the characteristics of the data and control signals. Accordingly, the motors 102 and 106 both are not powered, while the motor 203 is jointly powered and driven by the electronic control circuit 201 and the electronic control circuit 202. The drive shaft of the motor 203 performs a rotation in a direction and/or for a period of time, which is determined by the specific data and control signals forwarded to the electronic control circuits 201 and 202 via the bus 111 and the interfaces 109 and 110. The co-operation of the electronic control circuit 201 and of the electronic control circuit 202 may be co-ordinated by a data communication the via the interface 206 between the electronic control circuit 201 and the electronic control circuit 202.

The co-operation for jointly driving one or more motors by two or more co-operating electronic control circuits may alternatively or in part be co-ordinated by an appropriate network controller, according to the invention. Such a network controller may be a controller, which is controlled by an appropriate software program. However, in order to reduce the amount of data to be transferred via the bus 111, the coordination of the functions to be jointly performed by the electronic control circuits 201 and 202 may be done by a data communication via the interface 206, as shown in FIG. 2, enabling a direct data communication between them.

A known electronic control circuit, such as electronic control circuits 101 and 105, could comprise a microcontroller, which is controlled by a software program or program code stored in a non-volatile memory, such as an EEPROM, and further electric and electronic components known by those skilled in the art. Alternatively, instead of a microcontroller the control algorithm could be implemented in cheaper hardware.

The hardware of the electronic control circuits 201 and 202 is preferably identical and is preferably the same as the hardware of the identical, known electronic control circuits 101 and 105. The electronic control circuit 201 or the electronic control circuit 202 is distinguished from the known electronic control circuit in that the software program or program code stored in the non-volatile memory is modified with regard to the known software program.

The modification is at least done in that the software program or program code according to the invention stored in each of two co-operating electronic control circuits is adapted to enable a jointly operation or driving of an electric actuator, such as the electric motor 203.

In addition, the software program or program code according to the invention in each of two co-operating electronic control circuits may be also adapted to enable a data communication via a joint interface, interface 206 in FIG. 2, supporting the coordination for jointly driving the electric actuator. Thereby, the amount of data to be transferred to and from a network controller via the data and control bus, necessary for controlling the co-operation of two electronic control circuits for jointly driving the actuator, may be reduced significantly, as explained.

How to configure the software program or program code to enable the co-operation of two or more electronic control circuits according to the invention for jointly driving one or more loads or actuators is known by those skilled in the art and thus will not to be described in detail.

According to the invention electronic control circuits or electronic control units are used, in which the above-mentioned functions are provided by one or more software programs or program code controlling one or more microcontrollers. However, it will be understood that electronic control circuits or electronic control units may be used, in which these functions or a part of these functions are provided by hard-wiring or hardware without of the use of software.

When comparing the known electric circuit 100 in FIG. 1 with the electric circuit 200 in FIG. 2, it will be seen that the known solution would require three electronic control circuits, while the electric circuit 200 only requires two electronic control circuits for driving three actuators. Thereby a significant reduction of hardware is obtained. Since the same or similar computer programs or program code controlling the co-operation may be used for the operation of several electronic control circuits, a significant reduction of total costs is obtained for a mass product comprising an electric circuit according to the invention, such as a mass product for the automotive industry.

By providing an interface for data communication between co-operating electronic control circuits, the load of the data and control bus may be relieved, as mentioned. This allows to use a network with one or more network controllers and one or more buses, which is designed for a lower data load and is therefore less expensive.

Figure 3:
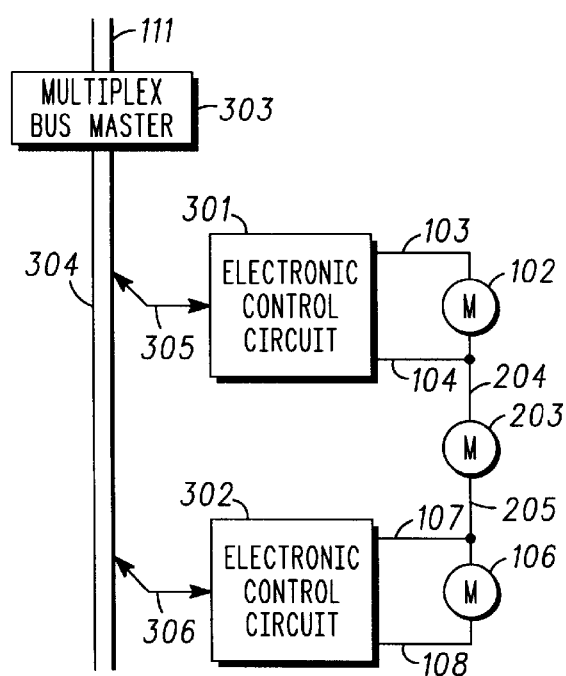
FIG. 3 illustrates a second embodiment of the invention of an electric circuit for driving the three electric motors.

The electric circuit 300 according to a second embodiment of the invention, shown in FIG. 3, is distinguished from the electric circuit 200, shown in FIG. 2, in that it comprises electronic control circuits 301 and 302 instead of electronic control circuits 201 and 202, which are basically the same but without an interface 206 between them. In addition, the software programs or program code stored in a non-volatile memory of each of the electronic control circuits 301 and 302 needs not to be or is differently adapted to control the co-operation of both electronic control circuits for jointly driving an actuator, i.e. electric motor 203 in FIGS. 2 and 3. Instead, the co-operation of the electronic control circuits 301 and 302 for jointly driving the actuator is controlled by a controller, such as a multiplex-bus-master (MBM) 303. The multiplex-bus-master 303 communicates with the data and control bus 111 of the data network (not shown) and controls the electronic control circuits 301 and 302 via a data and control bus 304 to which the electronic control circuits 301 and 302 are connected via interfaces 305 and 306. The combination of the multiplex-bus-master 303 and the electronic control circuits 301 and 302 allows to operate the electric motors 102, 203 and 106 in the same manner as explained in connection with FIG. 2.

The substitution of the electronic control circuits 201 and 202, shown in FIG. 2, by a combination of the electronic control circuit 301, the electronic control circuit 302 and the multiplex-bus-master 303 has the advantage that the hardware or the majority of the hardware concepts of the known electronic circuits 101 and 105, which are identical or similar, can be used for the electronic control circuits 301 and 302. Accordingly, only the software program or program code stored in the non-volatile memory of each of the electronic control circuits 301 and 302 has to be adapted for the co-operation of both circuits with regard to the software program or program code stored in the non-volatile memory of each of the known electronic control circuits 101 and 105. In other words, the hardware or at least the hardware concepts of the known electronic control circuits can be used to build the second embodiment of the invention, shown in FIG. 3.

How to assemble and program the components of the electric circuit 300 to provide the described same functions as the electric circuit 200, shown in FIG. 2, is known by those skilled in the art and thus will not be described in detail.

Figure 4:
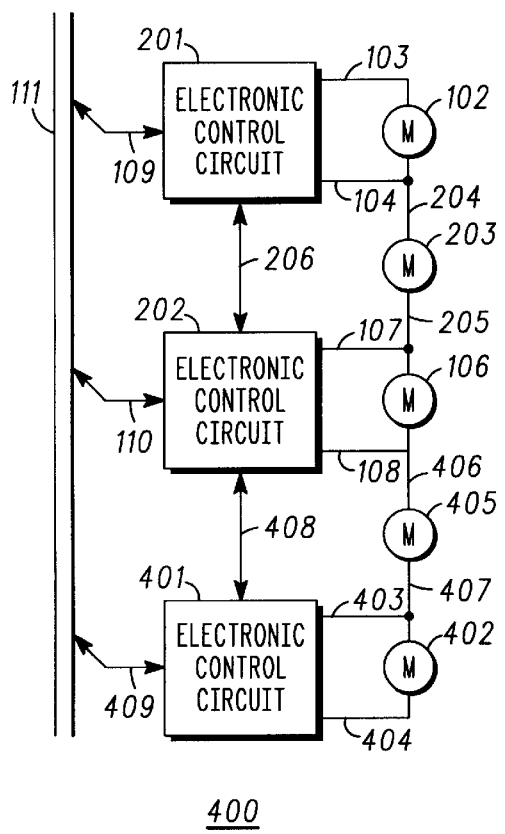
FIG. 4 illustrates a first embodiment of the invention of an electric circuit for driving the three electric motors and two further electric motors.

A third embodiment of the invention of an electric circuit for the driving of two further electric motors is illustrated in FIG. 4. The electric circuit 400 shown in FIG. 4 is distinguished from the electric circuit 200, shown in FIG. 2, in that it additionally comprises an electronic control circuit 401, a motor 405 and a motor 402. The electronic control circuit 401 comprises the same hardware or hardware concepts as the electronic control circuits 201 and 202 and its outputs are connected with the terminals 403 and 404 of the motor 402. The terminal 406 of the motor 405 is connected with the terminal 108 of the motor 106 and the terminal 407 of the motor 405 is connected with the terminal 403. Between the electronic control circuit 202 and the electronic control circuit 401 an interface 408 and between the electronic control circuit 401 and the bus 111 an interface 409 may be provided.

The electronic control circuit 401 works basically in the same manner for driving the motor 402 and the motor 405 as the electronic control circuit 202 for driving the motor 106 and the motor 203. In the preferred embodiment shown in FIG. 4, the electronic control circuit 202 and the electronic control circuit 401 co-operate for jointly driving the motor 405 in a similar manner as the co-operation of the electronic control circuit 201 and the electronic control circuit 202 for jointly driving the motor 203. Accordingly, the driving of the motor 405 is preferably controlled by an appropriate software program or program code stored in the non-volatile memories of the electronic control circuit 202 and the electronic control circuit 401.

However, since the electronic control circuit 202 co-operates with the electronic control circuit 201 for jointly driving the motor 203 and also co-operates with the electronic control circuit 401 for jointly driving the motor 405, instead of co-operating only in the driving of one motor, the software program or program code stored in the electronic control circuit 202, shown in FIG. 4, is adapted accordingly with regard to the software program or program code stored in the electronic control circuit 202; shown in FIG. 2. How to program these functions is known by those skilled in the art and thus will not be described. When comparing the electric circuit 100 for driving two electric motors, shown in FIG. 1, with the electric circuit 400 according to the invention, shown in FIG. 4, it will be understood that five electric motors are driven by three electronic control circuits, while the concept shown in FIG. 1 would require to use five electronic control circuits for driving five electric motors. Accordingly, the advantages outlined with regard to the comparison of the electric circuits shown in FIG. 1 and FIG. 2 are given in a more significant manner, since two electronic control circuits can be omitted. This accounts for a significant cost reduction when using the described concept of the invention for driving or operating three, five or even more loads, motors, solenoids or actuators in the described manner.

Figure 5:
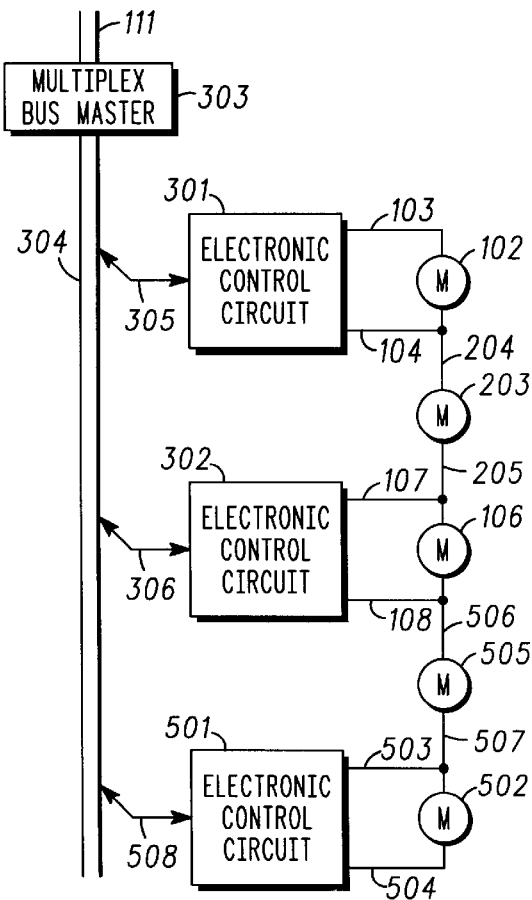
FIG. 5 illustrates a second embodiment of the invention of an electric circuit for driving the five electric motors.

FIG. 5 illustrates a fourth embodiment of the invention of an electric circuit for driving five electric motors. The electric circuit 500 is distinguished from the electric circuit 300, shown in FIG. 3, in that the electric circuit 500 additionally comprises an electronic control circuit 501, a motor 505 and a motor 502. The terminal 506 of the motor 505 is connected with the terminal 108 and the terminal 507 of the motor 505 is connected with the terminal 503 of the motor 502 being connected with an output of the electronic control circuit 501 for driving a motor. The terminal 504 of the motor 502 is connected with a further output of the electronic control circuit 501. The electronic control circuit 501 is controlled via the bus 111, the multiplex-bus-master 303, the bus 304 and an interface 508 between the bus 304 and the electronic control circuit 501.

The electric circuit 500 provides the same functions as electric circuits 300 and additionally allows the operation or driving of the additional motors 505 and 502 in a manner as described with regard to the motors 102, 203 and 106 in connection with FIG. 3 or FIG. 4. In a similar manner as with regard to the electronic control circuit 202 in FIG. 4, the program code stored in the non-volatile memory of the electronic control circuit 302, shown in FIG. 3, is modified and stored in the non-volatile memory of the electronic control circuit 302, shown in FIG. 5. The modification is necessary, since the electronic control circuit 302 in FIG. 5 co-operates in jointly driving the motor 203 together with the electronic control circuit 301, as explained in connection with FIG. 3, and also co-operates in jointly driving the motor 505 together with the electronic control circuit 501. In addition, the software program or software code controlling the multiplex-bus-master 303, shown in FIG. 5, is modified in this respect with regard to the software program or program code controlling the multiplex-bus-master 303, shown in FIG. 3.

The alternative electric circuit 500 for driving five actuators or motors also comprises only three electronic control circuits for driving five motors. Accordingly, the mentioned cost advantages, are still and even more valid for the electric circuit 500 with regard to the electric circuits 300 and 400.

While the invention has been described in terms of particular structures, devices and methods, those of skill in the art will understand based on the description herein that it is not limited merely to such examples and that the full scope of the invention is properly determined by the claims that follow.

What is claimed is:

1. An electric circuit with a first electronic control circuit controlling the operation of a first electric load to operate alternatively in a push mode or in a pull mode, characterized in that said first electronic control circuit controls the driving of a second electric load in cooperation With a second electronic control circuit, w herein the first electronic control circuit communicates with the second electronic control circuit via a multiplex data interface.

2. The circuit of claim 1, wherein said second electronic control circuit controls the driving of a third electric load in cooperation with a third electronic control circuit.

3. The circuit of claim 2, wherein said third electronic control circuit controls the driving of a fourth electric load.

4. The circuit of claim 1, wherein at least one of said electric loads is an electric actuator, an electric motor or an electric solenoid.

5. The circuit of claim 4, wherein the power for driving at least one of said electric actuators, electric motors or electric solenoid is provided by co-operating electronic control circuits.

6. The circuit of claim 1, wherein said electric circuit comprises a multiplex-bus-master controlling the communication for said cooperation at least in part.

7. The circuit of claim 1, wherein said electric circuit is a part of a control and data network having a plurality of nodes coupled together by a bus and each of said electronic control circuits represents a different node of said network.

8. A method for driving at least one of two electric loads alternatively in a push mode or in a pull mode, comprising the steps:

providing by a first electronic control circuit a first electric drive signal to a first terminal of a first electric load of said at least two electric loads and a second electric drive signal to a second terminal of said first electric load;

providing a third electric drive signal to a first terminal of a second electric load of said at least two loads by said first electronic control circuit and a fourth electric drive signal to a second terminal of said second electric load by a second electronic control circuit to drive said second electric load in cooperation with said first electronic control circuit; and providing a multiplex-bus-master for controlling, at least in part, cooperation between said first and said second electronic control circuit or between said first and said second electronic control circuits.

9. The method of claim 8, wherein said first electronic control circuit represents a first node of a control and data network having a plurality of nodes coupled together by a bus and said second electronic control circuit represents a second node of said network.

10. The method of claim 8, wherein the drive signals are different electric voltages or data signals driving or controlling the operation of the electric load to which the drive signals are applied.

11. The method of claim 8 wherein at least one of said at least two electric loads is an electric actuator, an electric motor or an electric solenoid.

12. An arrangement comprising electronic control circuits and a first electric load electrically coupled between a first terminal and a second terminal, and a second electric load coupled between a third terminal and a fourth terminal, wherein the second terminal and the third terminal are electrically connected, the electronic control circuits adapted to control in cooperation the operation of either electric load alternatively in a push mode or in a pull mode by providing an electric drive signal selectively to the terminals between which the selected load is coupled.

13. The arrangement of claim 12, comprising further electric loads between further two terminals per each load, wherein one of the further terminals of each further load is electrically connected to a terminal of a different load, wherein said second electronic control circuits are adapted to control the driving of a selected one of the further electric loads in cooperation by providing an electric drive signal selectively to the terminals between which the selected further load is coupled.

14. The arrangement of claim 12, wherein at least one of said electric loads is an electric actuator, an electric motor or an electric solenoid.

15. The arrangement of claim 12, wherein said co-operating electronic control circuits communicate with each other via a first interface or a second interface for performing said cooperation.

16. The arrangement of claim 12, wherein the electric circuits are a part of a control and data network having a plurality of nodes coupled together by a bus and each of said electronic control circuits represents a different node of said network.

17. A method for driving alternatively in a push mode or in a pull mode by electronic control circuits either of a first electric load electrically coupled between a first terminal and a second terminal, and a second electric load coupled between a third terminal and a fourth terminal, wherein the second terminal and the third terminal are electrically connected, comprising the steps:

selecting one of the first or second electric loads to drive;

providing an electric drive signal selectively to the terminals between which the selected load is coupled in cooperation of the electronic control circuits.

18. The method of claim 17, wherein the electronic control circuits represent nodes of a control and data network having a plurality of nodes coupled together by a bus.

19. The method of claim 17, wherein the drive signals are different electric voltages or data signals driving or controlling the operation of the electric load to which the drive signals are applied.

20. The method of claim 17, wherein at least one of the two electric loads is an electric actuator, an electric motor or an electric solenoid.

* * * * *